Feb. 23, 1960     H. Z. MARTIN     2,925,928
METHOD OF HANDLING SUBDIVIDED SOLIDS
Filed June 23, 1954
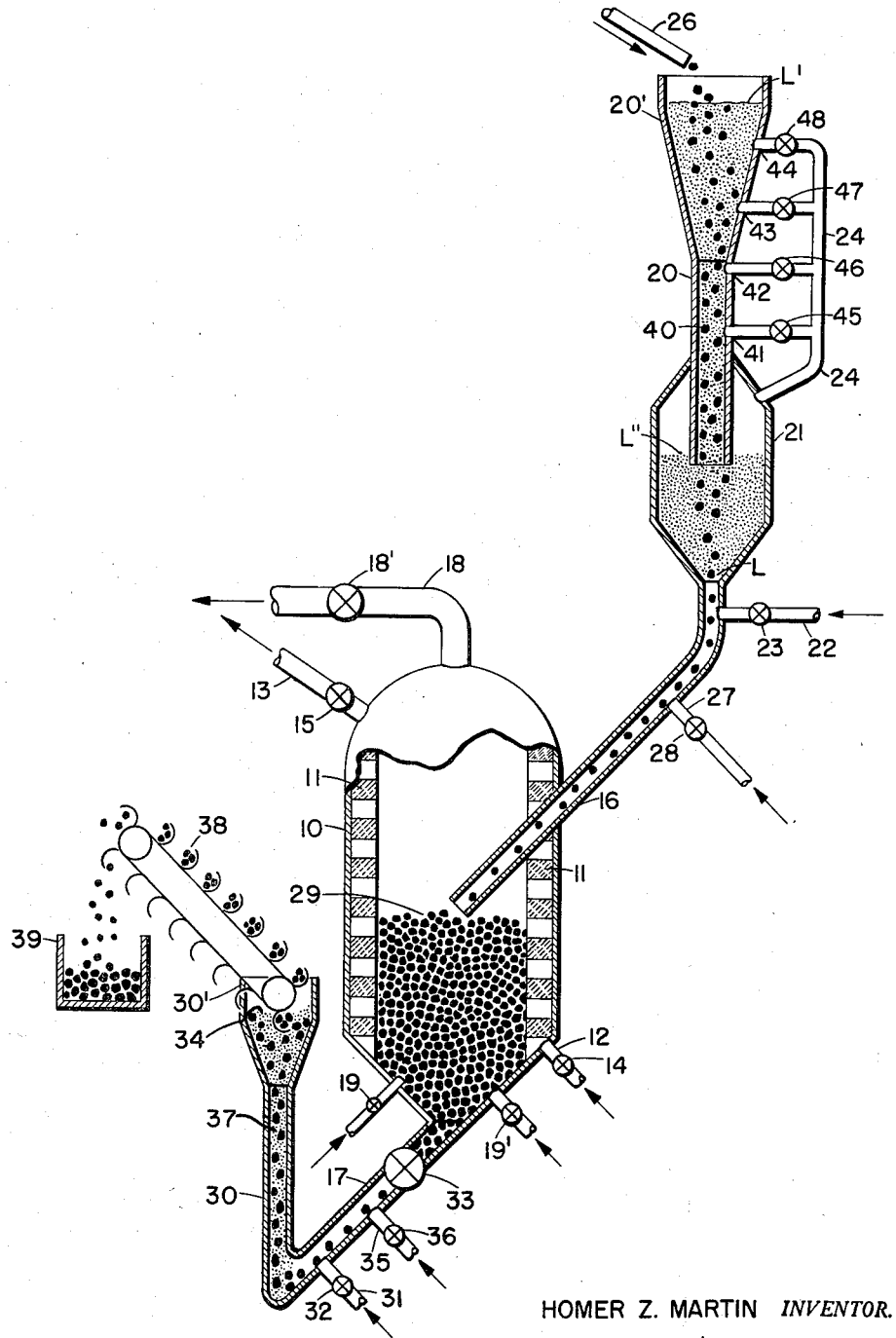
HOMER Z. MARTIN INVENTOR.
By *George J. Silbey* ATTORNEY

3

2,925,928

METHOD OF HANDLING SUBDIVIDED SOLIDS

Homer Z. Martin, Cranford, N.J., assignor to Esso Research and Engineering Company, a corporation of Delaware Application June 23, 1954, Serial No. 438,842

14 Claims. (Cl. 214—152)

This invention relates to the handling of subdivided solids and more particularly relates to a method for introducing coarse solids to and removing coarse solids from a zone of relatively high pressure.

Prior to the present invention, subdivided solids have been introduced to and removed from a zone of relatively high pressure by a number of well-known methods. It is, of course, essential to the successful operation of any of these methods that the subdivided solids be introduced to and/or removed from the high pressure zone with essentially no loss of product gas or vapor from the high pressure zone. Depending upon the particular size of the subdivided solids, different methods have been employed. In processes, for example, where the subdivided solids are finely divided such that their medium diameter is less than $\frac{1}{10}''$, it is possible to employ a so-called aerated standpipe. In these processes, the differential pressure between the high pressure zone and the point of introduction or removal of the solids is balanced by a column of fluidized solids in the aerated standpipe. Examples of this type of operation are fluid catalytic cracking, fluid coking, and fluid hydroforming of hydrocarbons. In these applications, a finely divided solid, such as a catalyst, is introduced to or removed from a vessel of relatively high pressure by means of an aerated standpipe containing such solids in a fluidized state. Finely divided solids are removed from one end of the aerated standpipe and other finely divided solids are added to the other end of the aerated standpipe. The difference in pressure between the vessel of relatively high pressure and the vessel feeding or receiving the finely divided material is balanced by the weight of the finely divided fluidized solids in the standpipe. The fluidized solids in these processes act similar to a liquid and their rate of flow through the standpipe is normally controlled by a valve. The finely divided solids are maintained in the fluidized state by the introduction of aerating gas along the standpipe.

In other processes the material to be introduced to a zone of relatively high pressure has a medium diameter greater than $\frac{1}{10}''$. In fact, in many processes the individual particles may be as large as 2" in diameter or even larger. This is true in such commercial processes as the production of sponge iron from iron ore and the carbonization or gasification of carbonaceous solids such as coal, lignite, shale, etc. In the carbonization process, for example, the carbonaceous material is introduced to a treating zone maintained at a pressure greater than atmospheric wherein gaseous products are produced from the coal by the application of heat with the resultant formation of solid coke. Normally the size of the coal particles fed to the treating vessel is larger than $\frac{1}{10}''$ in medium diameter so that it is not possible to employ the principle of the aerated standpipe. Smooth fluidization of such coarse solids in columnar form is not practical due to slugging of the coarse solids. Because it is not possible to introduce such coarse solids from atmospheric pressure to a treating zone of relatively higher pressure by means of an aerated standpipe, one method of introducing such coarse solids has been to employ lock hoppers. Although this particular method is a workable method, it is also a cumbrous method. In addition, there is a considerable leakage of gas from the treating zone and also a considerable maintenance problem involved in this type of system.

Another method of introducing coarse solids into a treating zone of relatively high pressure is by means of a tall vertical standpipe which is filled with the coarse particles. The rate of introduction of the coarse particles to the treating zone from the standpipe is controlled by a solids metering device such as a table valve and as coarse solids are introduced to the treating zone from the bottom of the standpipe, more coarse solids are added to the top of the standpipe to maintain the column of the coarse solids in the standpipe. In this method, an inert gas is introduced at the lower end of the standpipe between the standpipe and the inlet to the treating zone. This inert gas is introduced at a sufficiently high pressure so that none of the vaporous products from the treating zone can escape through the standpipe. Preferably the inert gas is introduced at a pressure slightly above the pressure in the treating zone in order to insure against any leakage of gas or vapor from the treating zone. A pressure drop results from the passage of this inert gas as it flows up the standpipe through the column of coarse solids and this pressure drop is employed to balance the difference in pressure existing between the treating zone and the atmosphere. A sufficiently high column of solids is employed in the standpipe so that the gas velocity upwards is definitely below the fluidization velocity of the coarse solids. However, in this method, a considerable quantity of inert gas is required to produce this pressure drop, especially if the particle diameter exceeds $\frac{1}{2}''$.

The present invention provides a method whereby the disadvantages of the prior art encountered in introducing coarse solids to and/or removing coarse solids from a zone of relatively high pressure may be substantially eliminated. Briefly, the present invention comprises providing a column of finely divided fluidized solids in a standpipe to thereby balance the difference in pressure between the atmosphere and the treating zone of relatively high pressure. In the case where it is desired to feed coarse solids to a treating zone of higher pressure through the standpipe, the density of the mass of fluidized solids in the standpipe is selected to be less than the apparent density of the coarse solids which are to be fed to the treating zone. In this situation, then, if the coarse solids are introduced into the top of the standpipe containing the fluidized bed of finely divided solids, the coarse solids will fall due to the force of gravity through the fluidized bed in the standpipe and pass to the treating zone of relatively high pressure. In accordance with the present invention, the coarse solids in passing from the standpipe to the treating zone are separated from the bed of finely divided fluidized solids constantly maintained in the standpipe by any well-known means, such as elutriation.

The principle of the present invention may also be employed to remove coarse solids from a zone of relatively high pressure. In this case, a standpipe is provided with a fluidized bed of finely divided solids having a fluid density selected to be greater than the apparent density of the coarse solids to be removed from the zone of relatively high pressure. If the coarse solids then are introduced into the bottom of the standpipe containing such a fluidized bed, the coarse solids will rise to the top of the fluidized bed where they may be removed from the surface of the fluidized bed.

The present invention is especially advantageous in operations which are of a continuous nature because it is capable of providing a continuous introduction and removal of coarse solids for a process. However, the present invention can also be advantageously utilized for intermittent operations. Also, since there are no mechanically moving parts involved in the present invention, there are essentially no maintenance problems involved in its operation. A further advantage over the prior art is that there is a minimum utilization of gas in the present method and, in addition, there is no leakage of product or reaction vapors or gases from the treating zone. The present invention finds practical application in processes such as the carbonization and gasification of carbonaceous materials. However, the present invention is not restricted to this field alone and may be utilized advantageously in any process wherein it is necessary to introduce coarse solids to or remove coarse solids from a zone of relatively high pressure.

It is an object of the present invention to provide a method for introducing coarse solids to and removing coarse solids from a zone of relatively high pressure which method results in a minimum of gas leakage from the zone of relatively high pressure and which operates with essentially no mechanical difficulties.

The invention will be best understood from the following more detailed description wherein reference is made to the accompanying drawing which is a diagrammatic cross-sectional illustration of a system in which a preferred embodiment of the invention is shown.

Referring now to the drawing, the present invention is illustrated in combination with apparatus adapted for conducting coal carbonization. Vessel 10 provides a treating zone wherein coal particles ranging from ¼" to 2" and larger in medium diameter are heated to produce by-product coke and gaseous products including ammonia and hydrocarbon products such as benzene, etc. The yield of coke is generally about 60–80% of the coal fed to vessel 10. Vessel 10 is normally constructed from silica bricks and is provided with jacket 11 in its wall, through which hot flue gases pass to provide the necessary heat for the coal carbonization reaction. Flue gases enter through inlet conduit 12 and pass up through the ductwork of jacket 11 and are withdrawn through outlet conduit 13. The rate of introduction of the flue gases and their pressure in jacket 11 is regulated by means of valves 14 and 15 in conduits 12 and 13, respectively. Coal particles are introduced to the treating zone in the interior of vessel 10 through line 16 and by-product coke particles are removed from the treating zone of vessel 10 by means of line 17. The gaseous hydrocarbon products are removed overhead from vessel 10 by means of line 18 through which the gases pass to recovery equipment (not shown) for cooling, purification and distillation. Valve 18' in line 18 is employed to control the pressure in the interior of vessel 10 and to regulate the rate of withdrawal of the volatile carbonization products. The temperature of the inner wall of vessel 10 may be about 2500° F., while the temperature of the coke in the treating zone may be about 1300 to 1400° F. Steam may be introduced through conduits 19 and 19', if desired, at a constant rate so that a mixture of water gas and coal gas may be produced.

During the carbonization process, the pressure on the inside of vessel 10 may be about 5–15 p.s.i.g. or higher so that it is necessary to introduce the coal to and remove the by-product coke from the treating zone without any appreciable loss of the valuable gaseous hydrocarbon products to the atmosphere. In accordance with the present invention, a substantially vertical standpipe 20 is provided for introducing the coarse coal particles to the interior of vessel 10 through line 16, and a bed 40 of fluidized solids is maintained in standpipe 20 and elutriator 21 to balance the differential pressure existing between the interior of vessel 10 and the atmosphere. The lower end of standpipe 20 communicates with elutriator 21, and an elutriation gas, which may be air, inert gas, etc., is introduced into line 16 through line 22. The rate of introduction of the elutriation gas and its pressure is regulated by valve 23. The elutriation gas is introduced into line 16 at a rate such that its upward velocity between the coal particles in line 16 is substantially above the free-falling velocity of the finely divided solids maintained as fluid bed 40 in elutriator 21 and standpipe 20 in order to prevent the finely divided fluidized solids in fluid bed 40 from passing downwards in line 16 to the interior of vessel 10.

The upward passage of the elutriation gas through elutriator 21 and standpipe 20 maintains the finely divided solids in the form of fluid bed 40 in the bottom of elutriator 21 and in standpipe 20 as shown in the figure. The approximate lower level of fluid bed 40 in the bottom portion of elutriator 21 is indicated by the reference character L. The upper portion of standpipe 20 is preferably enlarged as shown at 20' in the figure to reduce the gas velocity in that portion of the standpipe to thereby substantially prevent any of the finely divided solids from being carried out of standpipe 20 by the gas. The upper level of fluid bed 40 in enlarged section 20' of standpipe 20 is indicated by reference character L'. If necessary, a small amount of finely divided solids may be added to standpipe 20 from time to time as a replacement for any loss. The bottom portion of elutriator 21 communicates with the upper end of inlet line 16. Elutriator 21 is enlarged in its middle section to reduce the velocity of the elutriation gas flowing upward through line 16 into elutriator 21 so as to maintain fluid bed 40 at level L" in elutriator 21. Standpipe 20 extends down into elutriator 21 below level L" of fluid bed 40. The upper portion of elutriator 21 encloses the bottom portion of standpipe 20 and communicates with standpipe 20 by means of line 24 through which passes the portion of the elutriation gas rising to the top of elutriator 21. The gas flowing through line 24 may be introduced into standpipe 20 and/or to enlarged section 20' of standpipe 20 by means of one or more of lines 41, 42, 43 and 44 by adjusting valves 45, 46, 47 and 48 respectively. It will be understood however that the invention is not limited solely to the number of lines shown in the drawing. Valves 45, 46, 47 and 48 are adjusted to maintain fluid bed 40 at level L" in elutriator 21 and may also be employed advantageously to regulate the density of the fluidized solids in standpipe 20.

The coarse particles of coal are introduced into the top of standpipe 20 through line 26 by any conventional means such as a screw conveyor, bucket elevator or the like (not shown). The apparent density (weight of particle/unit volume) of the coal particles will range from about 70 to 100 lbs. per cu. ft. so that it is therefore necessary to utilize in standpipe 20 a finely divided solid having a fluid density less than about 70 lbs. per cu. ft. Thus, finely divided magnesia, alumina, silica, etc. may be employed because their fluidized density is about 20 to 40 lbs. per cu. ft. The finely divided solid should be of a size such that substantially all of the material is of a size range of about 10–1000 microns in medium diameter and preferably about 50–200 microns so that they will readily fluidize. It would be especially advantageous in this particular embodiment of the present invention to employ finely divided coal particles of that particular size range because there would be no contamination problem if any of the finely divided coal particles should happen to fall into the interior of vessel 10.

In the method of the present invention, coal particles of a size range of about ½" to 2" in medium diameter are introduced into the top of standpipe 20 wherein fluidized bed 40 of finely divided particles is maintained. The coarse coal particles fall due to the force of gravity through bed 40 in standpipe 20 into elutriator 21. The coarse coal particles continue to fall through the portion of fluidized bed 40 in elutriator 21 and pass down into line 16. The velocity of the upwardly flowing elutriation gas in line 16 is sufficient to prevent the finely divided fluidized solids from flowing down into line 16 but the velocity is not great enough to prevent the coarse coal particles from passing through line 16 and from thence into the treating zone in the interior of vessel 10.

It will be seen that the difference between atmospheric pressure and the pressure in the interior of vessel 10 is balanced by the weight of fluid bed 40 in standpipe 20 and elutriator 21. Normally this differential pressure will remain substantially constant so that the height of fluid bed 40 may be designed for a predetermined pressure in vessel 10. Minor variations in differential pressure, however, may be compensated for by adjusting level L″ in elutriator 21 by means of valves 45—48 in lines 41—40 to thereby increase or decrease the height of fluid bed 40 in standpipe 20. Thus, for example, by increasing the pressure drop in lines 41—44, level L″ may be lowered to raise level L′ of fluid bed 40 in standpipe 20 to thereby increase the height of fluid bed 40 if the differential pressure increases. The effective height of fluid bed 40 is measured between levels L and L′.

Line 27 is connected into line 16 below line 22 so that steam or inert gas may be introduced into line 16 through line 27 to provide a seal between the interior of vessel 10 and the elutriation gas introduced into line 16 through line 22 because it is necessary, when air is used as the elutriation gas, to prevent the oxygen containing gas from passing into the interior of vessel 10. The rate of introduction of the steam or inert gas into line 16 through line 27 is controlled by valve 28 such that a small amount of steam or inert gas will flow upwards in line 16 and also a small amount of steam or inert gas will flow downwards in line 16 to thereby provide a complete seal.

It is to be understood that this invention is not restricted to the particular form of apparatus shown in this particular embodiment of the present invention. Any other well-known means of maintaining a fluidized bed of finely divided solids for the purpose of providing a fluid head to balance the pressure drop between the treating zone and the atmosphere may be employed. Similarly, any other well-known means of separating the coarse coal particles from the finely divided fluidized solids could be employed. For example, a standpipe having a relatively large diameter, compared to inlet line 16, and tapered at its lower end could be employed to communicate directly with the top of inlet line 16. In this particular form of the present invention then the standpipe would serve not only as a means for maintaining a fluid bed to balance the differential pressure but would also serve as an elutriator at its lower end. Although in any form of the present invention there will be a small amount of elutriation gas escaping from the upper level of fluidized bed 40, there is a substantial reduction in the amount of gas employed in the present invention over the amount utilized if only a column of the coarse solids were employed in standpipe 20.

The carbonized coal particles in the interior of vessel 10 move downward as coke is withdrawn through line 17. The rate of withdrawal of the by-product coke particles is controlled by a solids metering device such as valve 33 shown in line 17. In this particular embodiment of the invention, a coal particle thus is introduced to the top of standpipe 20, falls through fluid bed 40 in standpipe 20 and elutriator 21, falls through line 16 and drops to upper level 29 of the solids mass in the interior of vessel 10 and eventually passes downward through the bed of solids, during which time the coal is converted to coke, and is removed through line 17. In removing the particles of coke from vessel 10, a problem of removing them without the loss of the valuable gaseous hydrocarbon products is encountered which is similar to the problem associated with introducing the coal particles to the interior of vessel 10.

In accordance with this invention, a substantially vertical standpipe 30 is provided which communicates at its lower end with the bottom of line 17. A fluidized bed 37 of a finely divided solid of the size range of about 10 to 1000 microns and preferably 60–200 microns is maintained in the interior of standpipe 30. A finely divided solid having a fluid density greater than the apparent density of the coarse coke particles is utilized so that the coke particles introduced to the bottom of standpipe 30 will rise to the top of fluid bed 37 due to the buoyant effect of the fluid mass. Since the density of the coke particles is about 30 to 70 lbs. per cu. ft., it is therefore necessary to employ a fluidized solid which will have a fluid density above about 70 lbs. per cu. ft. For example, finely divided iron oxide may be utilized for fluid bed 37 because its fluid density is about 100 to 200 lbs. per cu. ft. The finely divided solids in standpipe 30 are maintained in a fluidized condition by means of a fluidizing gas introduced through line 31 to the bottom of standpipe 30 via line 17.

The rate of introduction of the fluidizing gas which will normally be air is regulated by means of valve 32 in line 31. The coke particles in line 17 will move downward due to the force of gravity or many be moved by means of a screw conveyor or other well-known conveying means through line 17 to the bottom of standpipe 30. If the coke particles adhere to each other or to the interior wall of line 17, a conveyor will be necessary since the solid coke particles will not then readily move downward due to the force of gravity alone. Upon entering the bottom of standpipe 30, the coarse coke particles will rise upwards in standpipe 30 due to the difference in density between the coke particles and the fluid density of the finely divided fluidized solids. The coarse coke particles will accumulate at upper level 34 of the fluidized bed of finely divided solids in standpipe 30 from whence they may be removed by any well-known skimming method such as bucket conveyor 38 and deposited in collector 39. The upper portion of standpipe 30 is enlarged as shown at 30′ in the figure to reduce the velocity of the fluidizing gas to prevent loss of the fluidized solids.

Steam or other inert gas may be introduced through line 35 into line 17 to thereby provide a seal between the fluidizing gas entering line 17 from line 31 and the vaporous hydrocarbon products in vessel 10 when it is undesirable to mix the two. The rate of introduction of steam or inert gas through line 35 is controlled by means of valve 36 such that preferably a portion of the steam or inert gas flows downward in line 17 and a portion of the steam or inert gas flows upward in line 17 into vessel 10. The weight of the column of fluidized solids forming fluid bed 37 in standpipe 30 is selected to balance the difference in pressure existing between the pressure in the interior of vessel 10 and atmospheric pressure.

The following is a specific illustration of this invention as applied to the carbonization of coal but it will be understood that it is not intended to limit the invention to this particular process nor to this particular set of operating conditions. The pressure in the interior of vessel 10 is about 10 p.s.i.g. and the temperature is about 1900° F. Coal having a density of about 80 lbs. per cu. ft. and a particle size of about ½ to 2 or 3 inches in medium diameter is continuously introduced at the rate of about 1000 tons per day to the interior of vessel 10 and about 650 tons per day of coke having a particle size to about ½ to 2–3 inches in medium diameter are removed from the bottom of vessel 10. Fluid bed 40 in standpipe 20 and elutriator 21 comprises finely divided coal having a size range of about 50 to 200 microns. The height of fluid bed 40, measured from its lower level in the bottom of elutriator 21 to the upper level in the enlarged top portion of standpipe 20, is maintained in the range of about 40–45 feet. Air as the elutriating gas is introduced at a pressure of about 13 p.s.i.g. and at a rate of about 120 standard cubic feet per minute into the upper portion of line 16 through line 22. The upward velocity of the elutriating gas in line 16 is about 10 ft. per second based on the area between particles and in the enlarged section of elutriator 21 is about 0.4 ft. per second. In passing up standpipe 20, the superficial velocity of the air is about 0.5 ft. per second and in the enlarged upper portion 20′ of standpipe 20 the superficial gas velocity is reduced to about 0.2 ft. per second to avoid appreciable loss by entrainment of the finely divided solids.

In the removal of the by-product coke particles, the height of fluid bed 37 will be about 11 feet. Fluid bed 37 comprises finely divided iron oxide having a size range of about 50 to 200 microns in diameter and having a fluid density of about 150 lbs. per cut. ft. Fluidizing gas at about 13 p.s.i.g. and at a rate of 25–30 standard cubic feet per minute is introduced into line 17 from line 32.

What is claimed is:

1. A method of introducing coarse solids from a first zone to a second zone under a different pressure from that of said first zone which comprises providing a confined path between said zones, maintaining for only a limited portion of said confined path a vertically disposed elongated column of finely divided solids in a dense fluidized state between said zones to balance the pressure between said zones and passing coarse solids through said fluidized column of solids from said first zone to said second zone.

2. A method according to claim 1 wherein said coarse solids are greater than about 1/10 inch in diameter and said finely divided solids have a size within the range of about 10 to 1000 microns in diameter.

3. A method according to claim 1 wherein said coarse solids have a greater density than the fluidized finely divided solids and said coarse solids fall down through said fluidized column of finely divided solids.

4. A method according to claim 3 wherein said coarse solids are passed from a zone of relatively low pressure to a zone of relatively high pressure.

5. A method according to claim 1 wherein said coarse solids are passed from a zone of relatively high pressure to a zone of relatively low pressure.

6. A method for conveying coarse solids from a zone of relatively high pressure to a zone of relatively low pressure which comprises maintaining in a fluidized state between said zones a vertically disposed column of limited height and comprising finely divided solids having a fluidized density greater than that of said coarse solids, said zone of relatively high pressure communicating with the bottom portion of said fluidized column and said zone of relatively low pressure communicating with the top portion of said fluidized column, introducing coarse solids into the bottom portion of said fluidized column from said zone of relatively high pressure so that said coarse solids will rise up through said fluidized column of solids to the top thereof due to the difference in density between said fluidized column and the density of said coarse solids, and removing said coarse solids rising to the top portion of said fluidized column from the top portion of said fluidized column.

7. A method of introducing coarse solids from a zone of low pressure to a zone of high pressure which comprises providing a confined path between said zones, maintaining for a limited portion only of said confined path a vertically disposed elongated column of finely divided solids in a dense fluidized condition between said zones to balance the pressure between said zones, introducing coarse solids from said zone of relatively low pressure into the upper portion of said fluidized column of solids for downward passage through said fluidized column of solids and flowing said coarse solids under increased pressure from the bottom portion of said fluidized column of solids through the remainder of said confined path to said zone of relatively high pressure.

8. A method of introducing coarse solids from a zone of low pressure to a zone of high pressure which comprises providing a confined path between said zones, maintaining for a limited portion only of said confined path a vertically disposed elongated column of finely divided solids in a dense fluidized condition between said zones to balance the pressure between said zones, introducing coarse solids from said zone of relatively low pressure into the upper portion of said fluidized column of solids for downward passage through said fluidized column of solids to increase the pressure on said coarse solids, disengaging coarse solids from said column of dense fluidized solids and flowing only said coarse solids under increased pressure from the bottom portion of said fluidized column of solids through the remainder of said confined path to said zone of relatively high pressure.

9. A method of introducing coarse solids from a zone of low pressure to a zone of high pressure which comprises providing a confined path between said zones, maintaining for a limited portion only of said confined path a vertically disposed elongated column of finely divided solids in a dense fluidized condition between said zones to balance the pressure between said zones, introducing coarse solids from said zone of relatively low pressure into the upper portion of said fluidized column of solids for downward passage through said fluidized column of solids to increase the pressure on said coarse solids, passing said column of coarse solids and finely divided solids into an enlarged elutriating zone to separate finely divided solids from said coarse solids under increased pressure and passing only said separated coarse solids under increased pressure from the bottom portion of said elutriating zone through the remainder of said confined path to said zone of relatively high pressure.

10. A method of introducing coarse solids from a zone of low pressure to a zone of high pressure which comprises providing a confined path between said zones, maintaining for a limited portion only of said confined path a vertically disposed elongated column of finely divided solids in a dense fluidized condition between said zones to balance the pressure between said zones, introducing coarse solids from said zone of relatively low pressure into the upper portion of said fluidized column of solids for downward passage through said fluidized column of solids to increase the pressure on said coarse solids, separating said coarse solids at increased pressure from the bottom portion of said fluidized column while maintaining said fluidized column for said limited portion of said path and passing said separated coarse solids under increased pressure from the bottom portion of said fluidized column of solids through the remainder of said confined path to said zone of relatively high pressure.

11. A method according to claim 4 wherein said coarse solids under increased pressure are removed from the bottom portion of said fluidized column while maintaining said fluidized column for only a limited vertical portion of said confined path.

12. A method according to claim 5 wherein said coarse solids are removed at lowered pressure from the upper portion of said dense fluidized column.

13. A method of introducing coarse solids from a first zone to a second zone under a different pressure from that of said first zone which comprises providing a vertical confined path between said zones, maintaining for only a limited vertical section of said vertical confined path a vertically disposed elongated column of finely divided solids in a dense fluidized state between said zones and passing coarse solids through said fluidized column and then through said confined path beyond said dense fluidized column into said second zone at increased pressure.

14. A method of introducing coarse solids from a first zone to another zone under a different pressure from that of said first zone which comprises providing a confined path having a vertical section between said zones, maintaining for a section of said confined path a vertically disposed elongated column of finely divided solids in a dense fluidized state between said zones and passing coarse solids from one zone through said dense vertical fluidized column and into the other of said zones at a different pressure.

References Cited in the file of this patent

UNITED STATES PATENTS

| | | |
|---|---|---|
| 1,686,435 | Chance | Oct. 2, 1928 |
| 2,314,316 | Schlesman | Mar. 16, 1943 |
| 2,331,938 | Schutte | Oct. 19, 1943 |
| 2,428,995 | Rogers | Oct. 14, 1947 |
| 2,517,042 | Skelly | Aug. 1, 1950 |
| 2,561,396 | Matheson | July 24, 1951 |
| 2,667,280 | Lane | Jan. 26, 1954 |
| 2,753,061 | Trainer | July 3, 1956 |